United States Patent
Van Hullebusch et al.

(10) Patent No.: US 10,015,930 B2
(45) Date of Patent: Jul. 10, 2018

(54) POSITIONING AND SAFETY APPARATUS SUITABLE FOR CONTROL OF CONCAVE SUSPENSION IN A COMBINE HARVESTER

(71) Applicant: CNH Industrial America LLC, New Holland, PA (US)

(72) Inventors: Bart G. L. Van Hullebusch, Knesselare (BE); Frank R. G. Duquesne, Zwevegem (BE); Johan A. Van Der Haegen, Gavere (BE)

(73) Assignee: CNH Industrial America LLC, New Holland, PA (US)

(*) Notice: Subject to any disclaimer, the term of this patent is extended or adjusted under 35 U.S.C. 154(b) by 32 days.

(21) Appl. No.: 15/374,711

(22) Filed: Dec. 9, 2016

(65) Prior Publication Data

US 2017/0164560 A1 Jun. 15, 2017

(30) Foreign Application Priority Data

Dec. 10, 2015 (BE) .................................. 2015/5813

(51) Int. Cl.
| | | |
|---|---|---|
| *A01F 12/28* | (2006.01) | |
| *A01F 7/02* | (2006.01) | |
| *A01D 41/12* | (2006.01) | |

(52) U.S. Cl.
CPC .............. *A01F 12/28* (2013.01); *A01D 41/12* (2013.01); *A01F 7/02* (2013.01)

(58) Field of Classification Search
CPC .. A01F 12/28; A01F 7/02; A01F 12/00; A01F 21/00; A01D 41/12

(Continued)

(56) References Cited

U.S. PATENT DOCUMENTS 2,616,433 A * 11/1952 Anderson ............... A01F 12/28
241/88.4
2,794,438 A * 6/1957 Heth ....................... A01F 12/24
241/32

(Continued)

FOREIGN PATENT DOCUMENTS

DE 1950879 U 12/1966
EP 0468160 A1 * 1/1992 ............. A01F 12/18

(Continued)

OTHER PUBLICATIONS

EP16203085, European Search Report, dated Apr. 20, 2017, 5 pages.

*Primary Examiner* — John Weiss
(74) *Attorney, Agent, or Firm* — Peter K. Zacharias; Patrick M. Sheldrake (57) ABSTRACT

An apparatus that controls the position of a component of a mechanical system, such as an adjustable concave in a combine harvester, while at the same time exhibiting a safety function that is reversible without requiring a long downtime of the combine. The apparatus includes a control part and an auxiliary part, both pivotable about the same axis, and a force transmission part to maintain these two parts in an assembled state by a spring force, as long as the component is subjected to forces below a given limit. When the forces exceed the limit, the auxiliary part and the control part are configured to become separated in such a manner that they can be reassembled by the intervention of an actuator. The safety function of the apparatus resembles the operation of a shear bolt.

14 Claims, 11 Drawing Sheets

(58) Field of Classification Search
USPC .................................. 56/10.2 J, 10.3; 460/62
See application file for complete search history.

(56) References Cited

U.S. PATENT DOCUMENTS

| | | | | |
|---|---|---|---|---|
| 2,931,363 | A * | 4/1960 | Bulin | A01F 12/28 |
| | | | | 241/32 |
| 3,771,530 | A * | 11/1973 | Wassell | A01D 41/12 |
| | | | | 460/105 |
| 4,271,850 | A * | 6/1981 | Ryczek | A01F 12/16 |
| | | | | 460/106 |
| 4,330,000 | A | 5/1982 | Peiler | |
| 4,484,588 | A * | 11/1984 | Huhman | A01F 12/28 |
| | | | | 460/106 |
| 4,802,496 | A | 2/1989 | Bennett | |
| 5,489,239 | A * | 2/1996 | Matousek | A01F 12/28 |
| | | | | 460/109 |
| 7,118,475 | B2 | 10/2006 | Schenk | |
| 7,392,123 | B2 | 6/2008 | Heinsey et al. | |
| 7,393,274 | B2 | 7/2008 | Voss et al. | |
| 7,803,040 | B1 | 9/2010 | Flickinger et al. | |
| 8,133,101 | B2 | 3/2012 | Regier et al. | |
| 8,157,629 | B2 | 4/2012 | Yanke et al. | |
| 2005/0176484 | A1* | 8/2005 | Schenk | A01F 12/28 |
| | | | | 460/109 |

FOREIGN PATENT DOCUMENTS

| | | | | |
|---|---|---|---|---|
| EP | 2377387 | A2 | 10/2011 | |
| GB | 2065437 | A | 7/1981 | |
| WO | WO-2013082236 | A1 * | 6/2013 | ............ A01F 12/28 |
| WO | 2014191804 | A1 | 12/2014 | |

* cited by examiner

POSITIONING AND SAFETY APPARATUS SUITABLE FOR CONTROL OF CONCAVE SUSPENSION IN A COMBINE HARVESTER

CROSS REFERENCE TO RELATED APPLICATION

This application claims priority to Belgium Application No. 2015/5813 filed Dec. 10, 2015, the contents of which are incorporated herein by reference.

FIELD OF THE INVENTION

The present invention is related to a positioning and safety apparatus that is primarily, but not exclusively, suitable for use in the suspension of concaves in a combine harvester.

STATE OF THE ART

Agricultural combine harvesters comprise threshing rotors that rotate with respect to concave gratings, in short 'concaves', in order to separate grains from residue crop materials such as stalks and leaves. Threshing rotors are arranged transversally or longitudinally with respect to the driving direction of the harvester. The distance between the concaves and the rotors is adjustable in order to be able to adapt the combine to different crop types and harvesting conditions. A safety mechanism is required to protect the combine when dense swathes of crops or large rigid objects enter the machine, such as stones or pieces of metal or wood. In present day combines, a shear-bolt system is installed. When a large object enters the space between a rotor and a concave, the instantaneous force breaks the bolt, and the concave falls away from the rotor, so as to prevent damage.

The problem with this shear-bolt type mechanism, is that the combine has to be stopped and the shear-bolt replaced whenever a breakage occurs. In this case, the grain tank has to be emptied in order to be able to reach the shear bolt and replace it. This downtime is an inconvenience that is undesirable in modern day harvesting practice.

Other areas of a combine or of other work machines are protected by similar shear-bolt systems, which would likewise benefit from a system that causes less downtime when the system has to be reset after a breakage.

SUMMARY OF THE INVENTION

The present invention is related to an apparatus that ensures the control of the position of a component of a mechanical system, such as an adjustable concave in a combine harvester, while at the same time exhibiting a safety function that is reversible without requiring a long downtime of the system. The apparatus comprises a control part and an auxiliary part, both pivotable about the same axis, and means to maintain these two parts in an assembled state by a spring force, as long as the component is subjected to forces below a given limit. When the forces exceed the limit, the auxiliary part and the control part are configured to become separated in such a manner that they can be reassembled by the intervention of an actuator included in the apparatus of the invention and—during normal operation—used for controlling the position of the component. In a preferred embodiment, the apparatus is designed so that its safety function resembles the operation of a shear bolt. The invention is in particular related to a positioning and safety apparatus as disclosed in the appended claims.

DETAILED DESCRIPTION OF PREFERRED EMBODIMENTS OF THE INVENTION

Embodiments will now be described with reference to the drawings. The detailed description is not limiting the scope of the invention, which is defined only by the appended claims. A preferred embodiment of the apparatus of the invention will be first described, wherein the apparatus is configured for the positioning and safety of a set of concaves in a combine harvester comprising longitudinally arranged threshing rotors. The apparatus is however suitable for other applications as well, as will be discussed later in this description.

Figure 1:
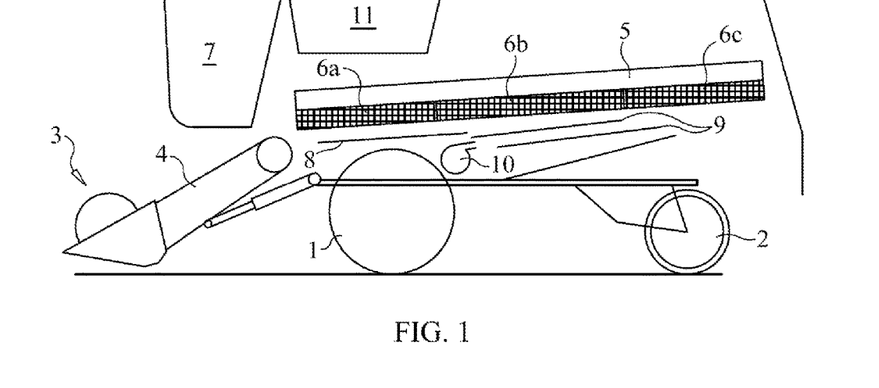
FIG. 1 is a schematic side view of an axial flow combine harvester, showing the position of the threshing rotors and concaves.

FIG. 1 shows the main components of an axial flow combine harvester, mounted on front and rear wheels 1 and 2. Crops are cut from the field by the header assembly 3, and supplied by the feeder 4 to a twin set of threshing rotors 5, arranged along the longitudinal direction of the harvester and tilted slightly upward with respect to the horizontal. The threshing rotors 5 are rotatably mounted with respect to concaves. Preferably several sets 6a-6c of concaves are mounted along the length of the rotors, with at least the first set 6a being adjustable with respect to the rotors. The driver's cabin 7 is indicated, as well as the cleaning arrangement, comprising a grain pan 8, a set of sieves 9 and a blower 10 for blowing light residue material towards the back of the harvester. Grains fall through the sieves and are transported by an assembly of augers and a grain elevator (not shown) to a grain tank 11.

Figure 2:
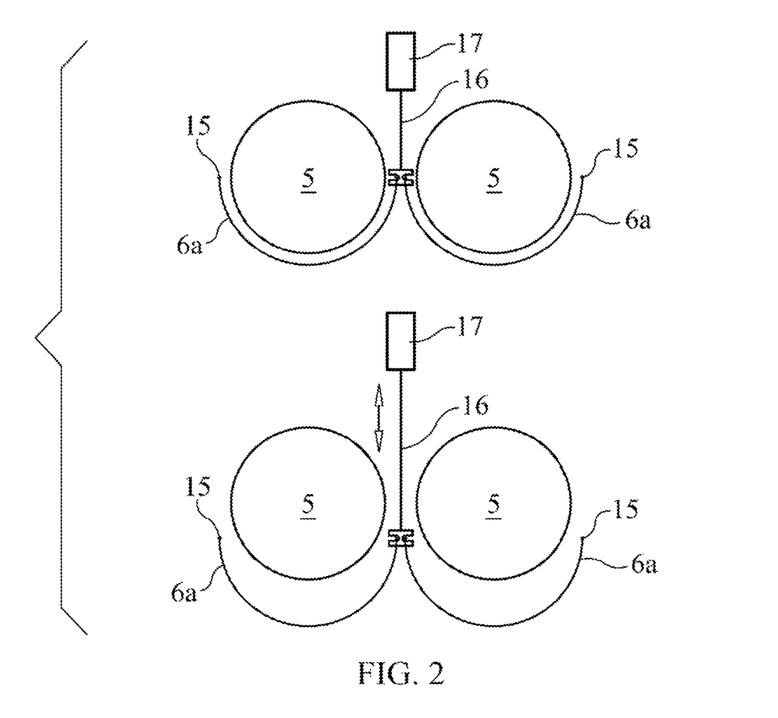
FIG. 2 illustrates the general concept as known in the art, of a system for adjusting the position of the concaves with respect to the threshing rotors, in the axial flow combine of FIG. 1.
Figure 3:
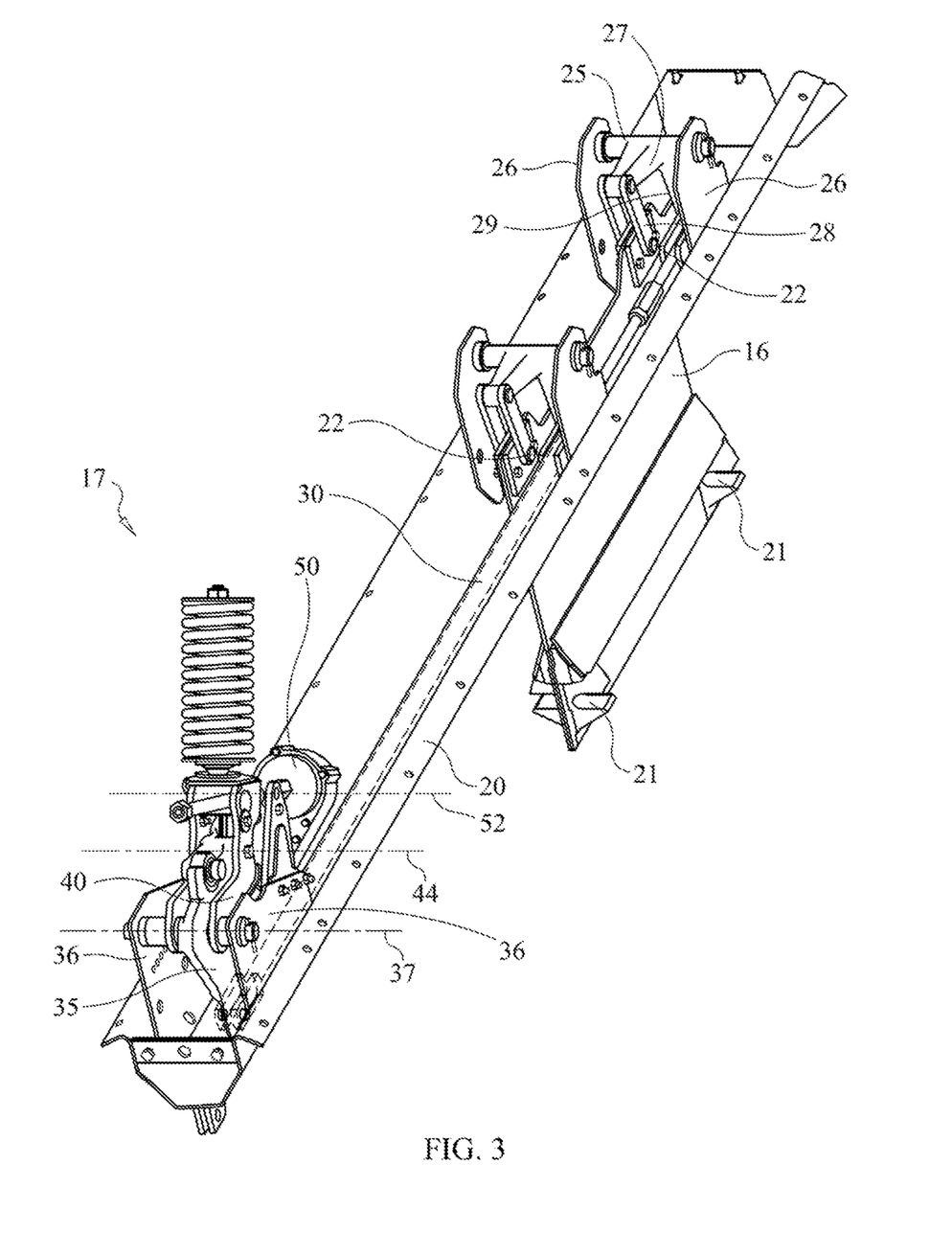
FIGS. 3 and 4 illustrate a 3D view and a side view of a system for adjusting the position of the concaves, provided with an apparatus according to an embodiment of the invention.

As schematically illustrated in FIG. 2 for a twin rotor arrangement, adjustment of the pair of concaves 6a takes place by pivoting the concaves about their outer edges 15. In the area between the threshing rotors, the inner edges of the concaves are suspended from a support plate 16, which is movable up or down as indicated by the arrows. This movement is controlled by a positioning and safety apparatus 17. FIG. 3 shows a preferred embodiment of this arrangement, provided with a positioning and safety apparatus 17 according to the present invention.

An elongate gutter-shaped structure 20 is mounted on the chassis of the harvester, above the threshing rotors and the concaves. In this way, the gutter-shaped structure is an embodiment of the 'fixed structure' referred to in the appended claims. The rotors and concaves as such are not shown in FIG. 3. The inner edges of the pair of concaves are suspended from the structure 20 via the support plate 16 already described with reference to FIG. 2. At its lower end, the support plate 16 is provided with recesses 21 wherein the edges of the concaves are slidably mounted. The plate 16 is itself suspended in two attachment points 22, from a pair of pivoting structures, each of the latter being provided with a rotatable axle 25 mounted between two fixed brackets 26. The axle 25 comprises a first radially oriented arm 27 connected to an attachment point 22 of the plate 16 via pivotable links 28. The second radial arm 29 is pivotably connected to a control rod 30 extending along the length of the gutter-shaped structure 20, and connected at its outer end to the positioning and safety apparatus 17. The above-described suspension mechanism of the plate 16 is known as such and described here only for the sake of clarifying the interaction with the apparatus of the invention.

Figure 4:
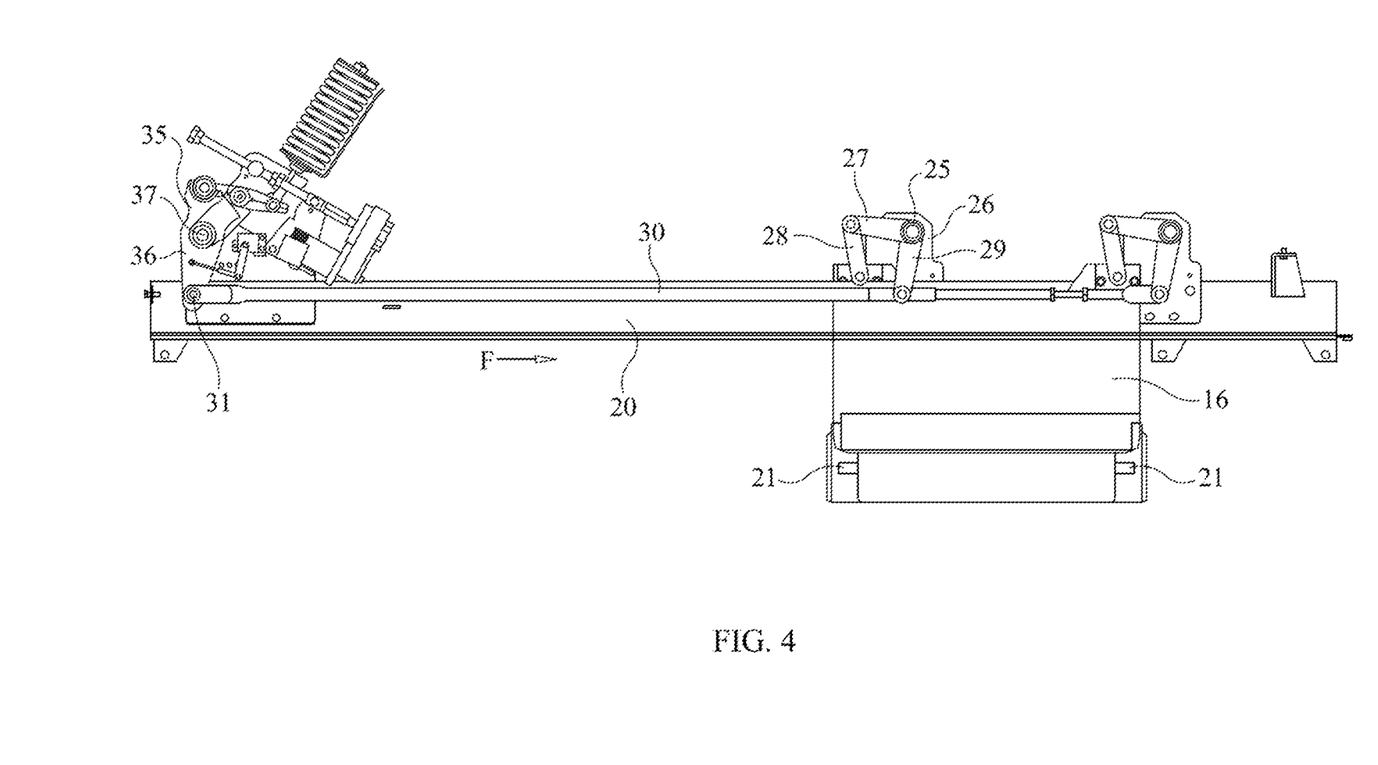

FIG. 4 shows a side view of the complete mechanism. The end 31 of the control rod 30 is pivotably connected to a control plate 35 that is itself pivotably mounted between two fixed support brackets 36 ('fixed' meaning immovably attached to the gutter-shaped structure 20). Rotation of the control plate 35 about its pivot axis 37 actuates a swing movement of the control rod 30 which in turns actuates a rotation of the axles 25, via the radial arms 29 connected to the rod 30, which finally results in the lifting or lowering of the support plate 16, and the adjustment of the position of the concaves. How the control plate's rotation itself is actuated will now be explained, with reference to the more detailed view of the apparatus 17 shown in FIG. 5, with reference also to FIGS. 3 and 4 for a number of the numerical references used hereafter.

Figure 5:
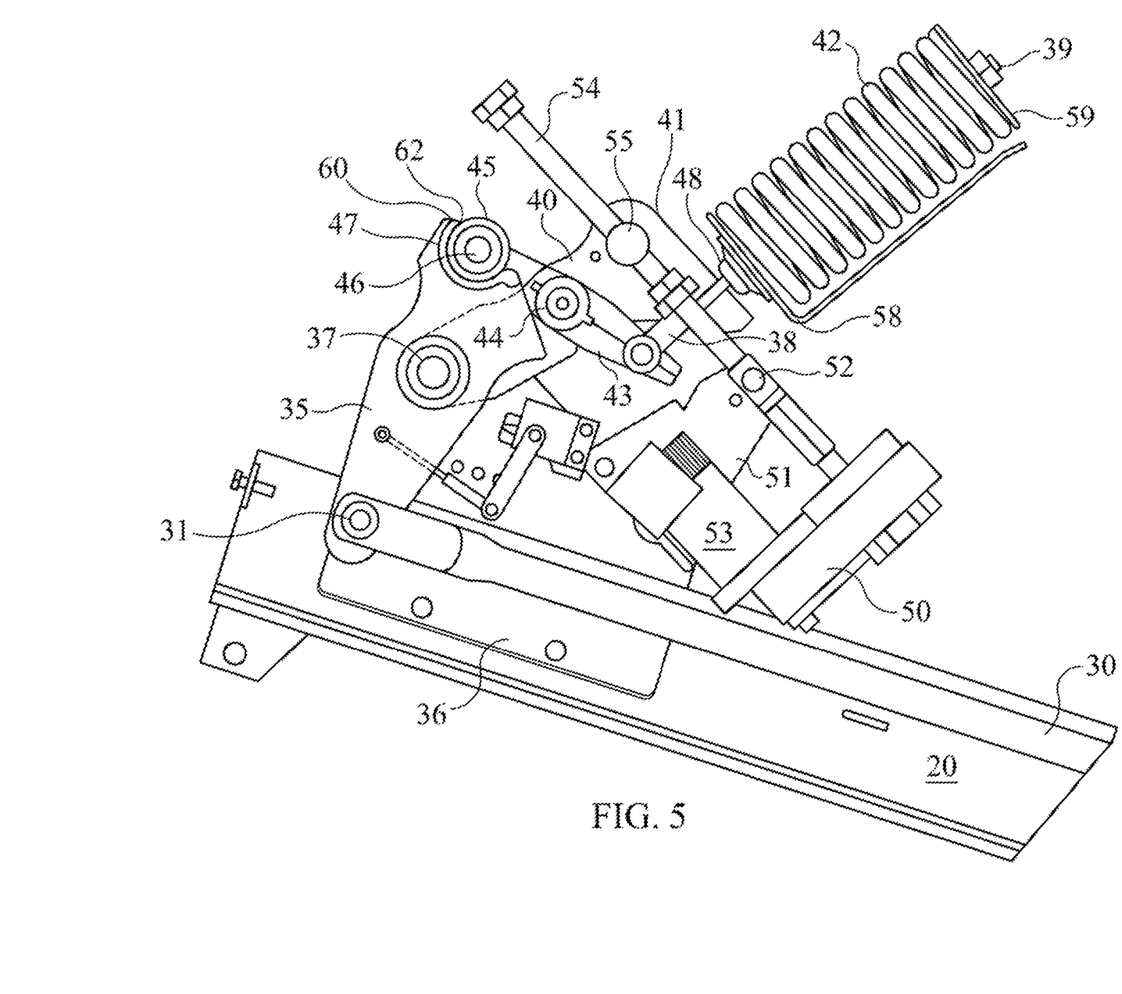
FIG. 5 shows a detailed view of the apparatus according to the embodiment shown in FIGS. 3 and 4.

A fork-shaped component 40, hereafter referred to as the 'fork' 40, is pivotable about the same pivot axis 37 as the control plate 35, the legs of the fork extending on either side of the control plate 35, the top of the fork 40 forming a platform 41 on which a mechanical spring 42 is mounted. The spring is pre-compressed between a lower end plate 58 and an upper end plate 59. The fork 40 is an embodiment of the 'auxiliary part' cited in the summary and in the appended claims. The fork 40 and the control plate 35 are held together by the spring force in the following manner. A spring force transmission part 43 is mounted between the legs of the fork 40 and is pivotable with respect to the fork 40 about a pivot axis 44 parallel to the pivot axis 37 of the control plate 35. One end of the force transmission part 43 is pivotably connected to a rod 38, which runs through an opening in the fork's platform 41 and through the mechanical spring 42 and its lower and upper end plates 58/59. The rod is connectable to the upper end plate 59 in the following manner: a screw 39 engages with the threaded end of the rod 38 and allows the positioning of the upper end plate 59 at a given position with respect to the rod 38, thereby setting a pre-defined pre-stressed condition of the spring 42. The spring force is thus exerted between the force transmission part 43 and the fork 40. More precisely, the spring 'pulls' the rod 38 and thereby the second end of the force transmission part 43 (opposite the end carrying the roller 45) towards the platform 41 of the fork 40. A limited movement of the spring with respect to the platform 41 is made possible by a ball-shaped connection piece 48 between the lower end plate 58 of the spring and the platform 41. The other end of the force transmission part 43, opposite to the first end, as seen with respect its rotation axis 44, carries a roller 45 that is rotatable with respect to the transmission part 43 about rotation axis 46. The roller 45 is lodged in a seat portion 47 at the top of the control plate 35, i.e. at the end of the control plate 35 that is opposite the end where the control rod 30 is pivotably attached. The force transmission part 43 acts as a lever that pushes the roller 45 against the seat portion 47 with a force determined by the spring's pre-compression and the dimensions of the force transmission part 43.

As long as the roller 45 is locked into the seat portion 47 in this manner, the control plate 35, the fork 40, the force transmission part 43 and the spring 42 form a single structure that is movable in one way only: by rotation of the control plate 35 about its pivot axis 37. This rotation of the control plate and thus of the complete structure can be set in motion by an actuator 50 that is itself pivotably mounted between fixed brackets 51, the actuator being pivotable about pivot axis 52. The actuator comprises an electric motor 53 which drives the rotation of a threaded rod 54. The rod 54 is engaged in a threaded opening of a cylinder 55, the opening being transversal to the cylinder's axis, the cylinder 55 itself being pivotably mounted between the legs of the fork 40. Rotation of the threaded rod 54 therefore displaces the cylinder 55 with respect to the rod 54, resulting in a rotation of the fork 40 and thereby of the control plate 35 tied to the fork 40 by the spring force. This actuated rotation of the control plate 35 results in the actuation of the control rod 30 and of the support plate 16. The rotation of the control plate 35 is made possible furthermore by the fact that the actuator 50 itself is pivotable as a whole about pivot axis 52. This is the way in which the positioning and safety apparatus 17 controls the position of the concaves during normal operation of the harvester.

During such normal operation, when the concaves are in a given position, i.e. the threaded rod 54 is not rotating, it may happen that rigid objects or dense quantities of crops or debris enter the space between the concaves and the threshing rotors. These obstructions exert a downward force on the concaves, which will result in the control rod 30 being subjected to a force F in the direction of the concaves (arrow F in FIG. 4). As the actuator 50 is inoperative, this will in turn exert a force on the roller 45, said force attempting to induce the roller to roll out of the seat portion 47. However, in order for the roller to be lifted out of the seat portion 47, the force exerted on it must be sufficient to counteract the spring force that works to push the roller 45 into this seat portion 47. When the downward force on the concaves is insufficient to generate this roller release force (i.e. when the obstructions are not large enough to push the concaves downwards), the assembly is maintained and the roller 45 stays locked in the seat portion 47. In order to overcome the spring force and induce the roller 45 to be lifted out of the seat portion 47, the obstruction entering the space between the concaves and the threshing rotors must be large and rigid enough to push the concaves downwards. The apparatus is configured so that as soon as this happens, i.e. as soon as the roller 45 rolls out of the seat portion 47 over a small distance, it is subsequently lifted out of the seat portion in a short time, so that the control plate 35 is free to pivot about its axis 37, and the concaves are free to move away from the threshing rotors, without damage or obstruction.

Figure 6A:
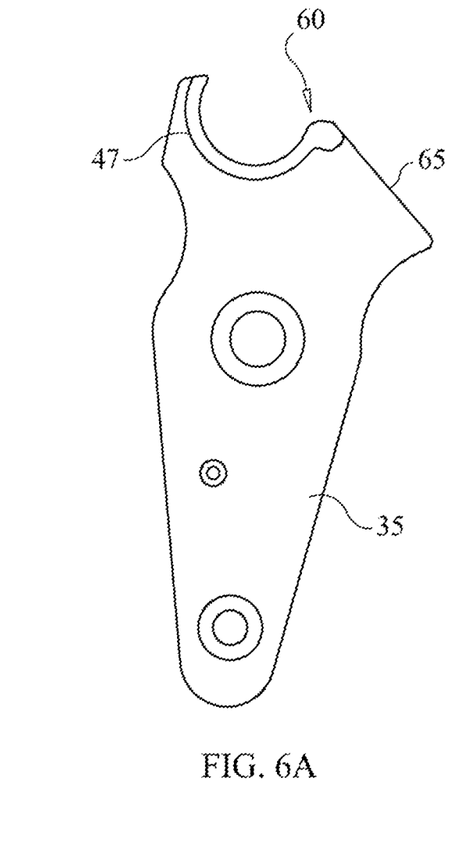
FIGS. 6a and 6b show the control part applicable in an embodiment of the apparatus of the invention, wherein the control part is a plate of a suitable shape and having suitable dimensions, which make the apparatus operable in a similar manner to a shear-bolt.
Figure 6B:
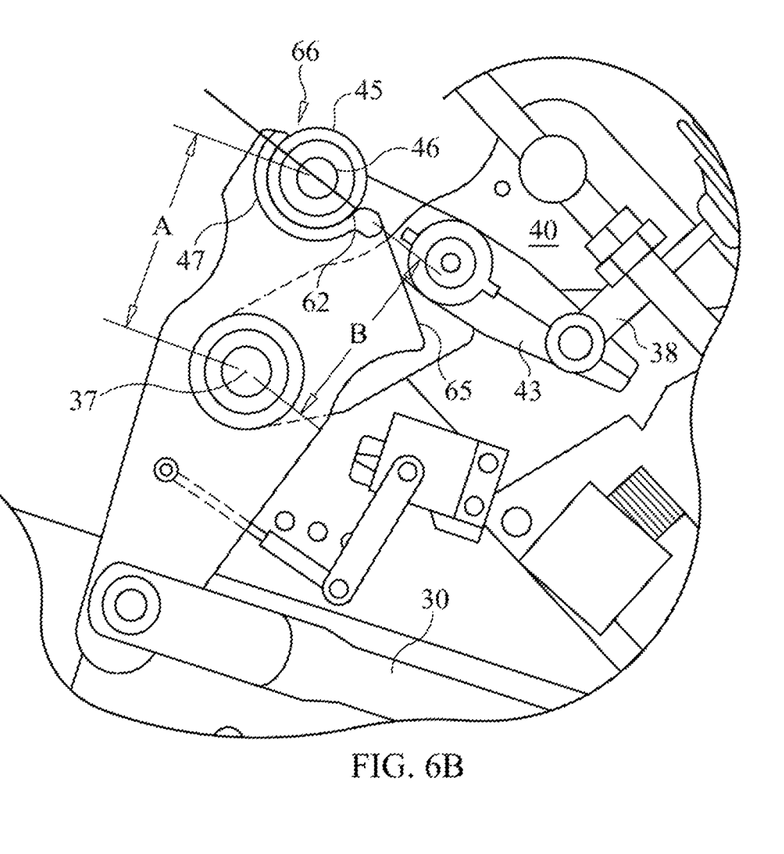
Figure 7A:
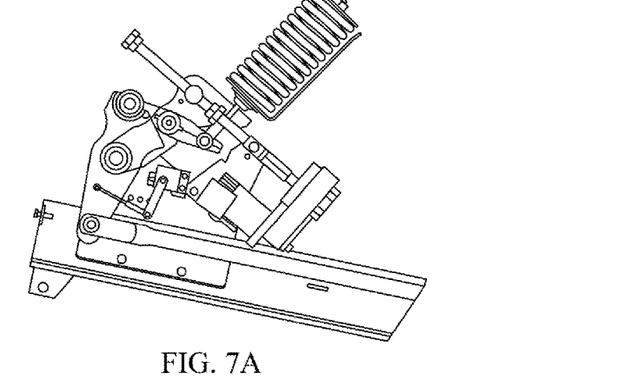
FIGS. 7a to 7f show a step-by-step evolution of the position of the apparatus during a breakage, as a function of the angle between the control part and the auxiliary part of the apparatus.
Figure 7B:
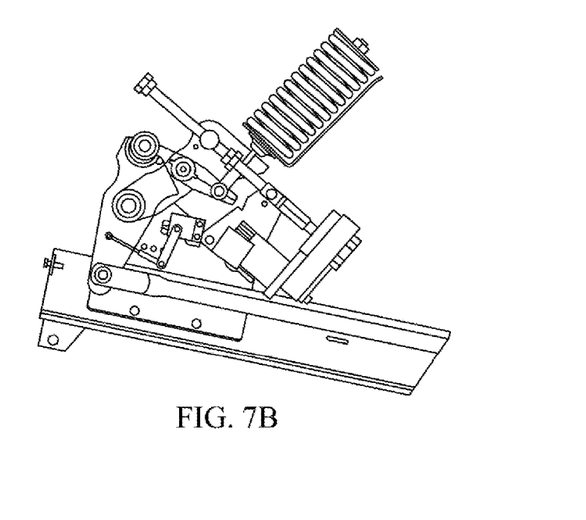
Figure 7C:
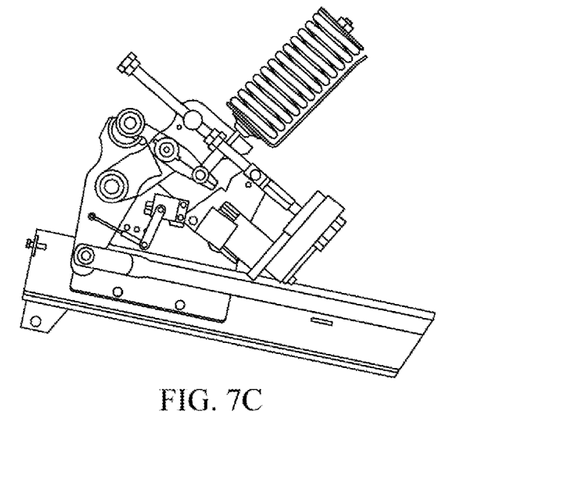
Figure 7D:
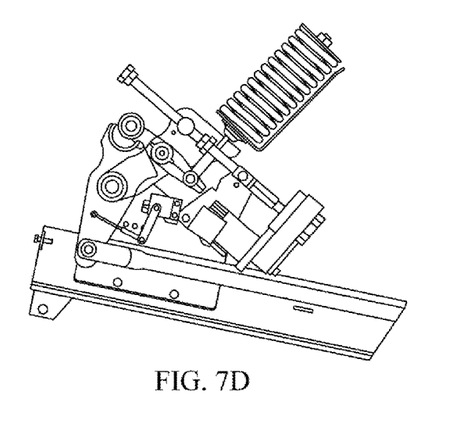
Figure 7E:
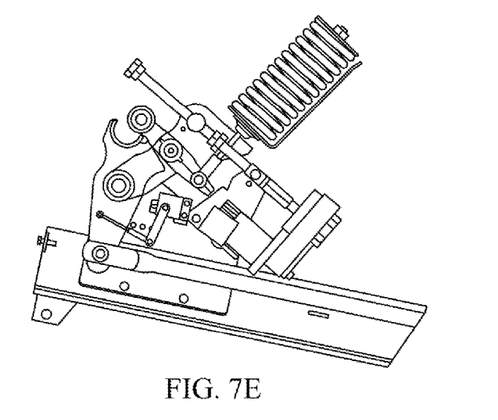
Figure 7F:
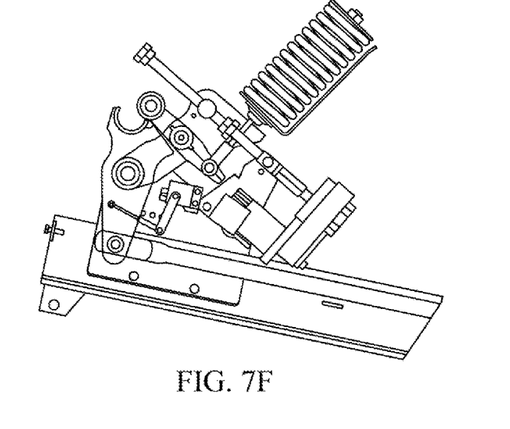

According to the preferred embodiment shown in the drawings, this release of the roller 45 from its seat portion 47 happens in a very short timespan, in such a manner that the mechanism approximates the operation of a shear-bolt. This effect is obtained by a number of measures explained on the basis of a detail of the control plate 35 shown in FIG. 6a and of the control plate 35 and roller assembly in the locked state in FIG. 6b. The dimensions shown are examples and not limiting to the claim scope. Application of these dimensions and shapes however ensures the shear-bolt-like operation. The seat portion 47 is shaped as a semi-circle with a convex portion 60 to one side, so the roller 45 needs to roll over said convex portion 60 in order to be fully released from the seat portion. The distance A between the control plate's pivot axis 37 and the roller's rotation axis 46 needs to be larger than the distance B between the control plate's pivot axis 37 and the transition point 62 between the semi-circular seat portion 47 and the convex portion 60. If the latter condition is not fulfilled, the force F would act to push the roller 45 more strongly into the seat portion 47 rather than lifting it out of the seat portion. Preferably there is a small clearance 66 between the roller 45 and the seat portion 47 when the apparatus is in the locked condition, so as not to obstruct the movement of the roller, once this movement has initiated.

Figure 8:
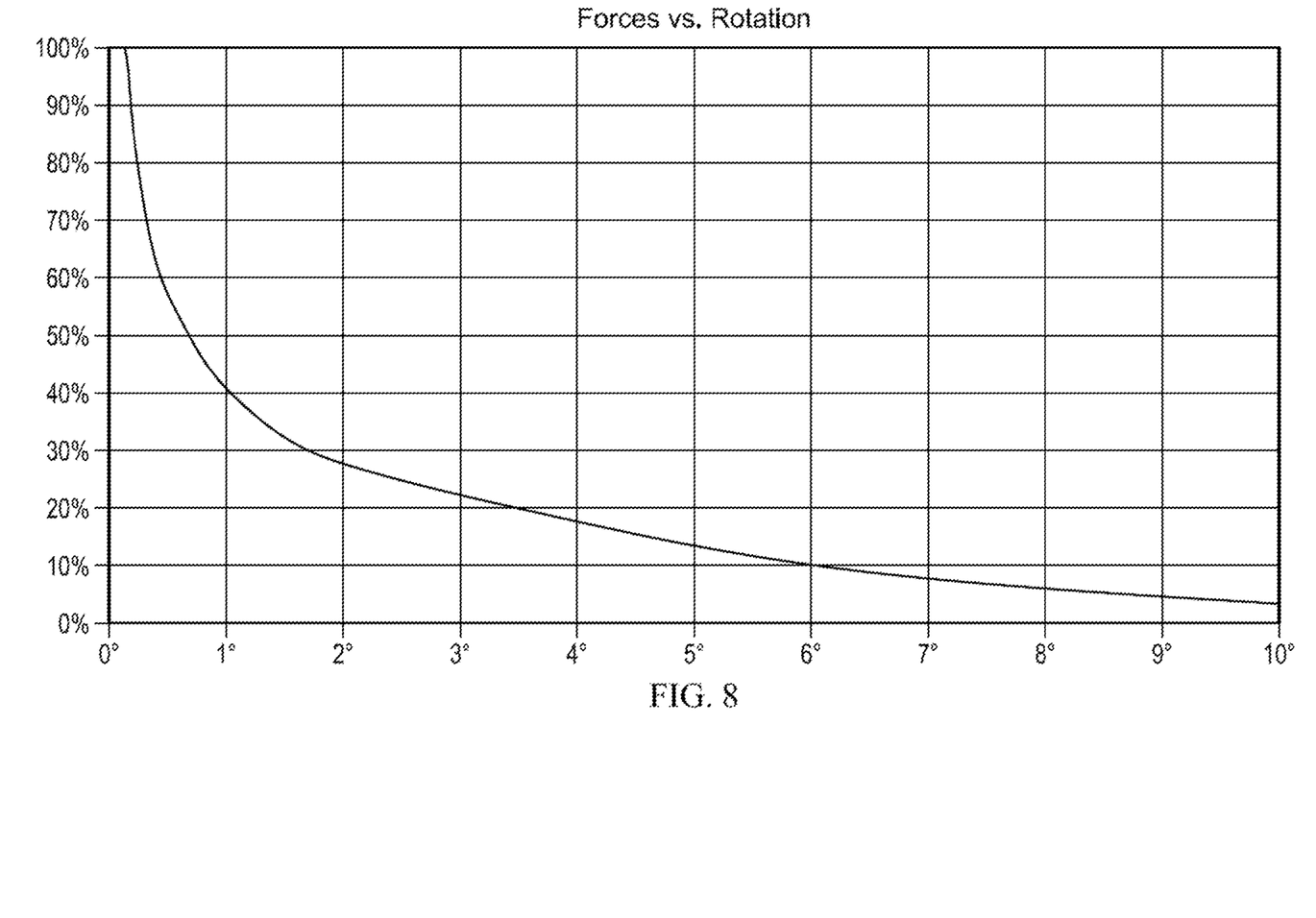
FIG. 8 is a curve showing the relation of the force required to move the roller, as a function of the angles shown in FIGS. 7a to 7f.

The fine adjustment of these dimensions and in particular of the radius of the convex portion 60 makes it possible for the apparatus to approach the operation of a shear bolt, as illustrated in the sequence of drawings shown in FIGS. 7a to 7f, wherein the motion of the roller 45 over is illustrated, as it takes place in the instants after a breakage occurs, over a rotation angle of 10° measured between the control plate 35 and the fork 40. As the roller 45 is lifted out of the seat portion 47, the control plate 35 becomes free to rotate about its rotation axis 37, to accommodate the enforced downward movement of the concaves. The roller passes the convex portion 60 at the edge of the seat portion, and then rolls onto a slanted portion 65 at the top of the control plate 35 (see FIG. 6). All this time, the relative position of the fork 40, the actuator 50 and the threaded rod 54 has remained unchanged, i.e. the downward movement of the concaves takes place independently of any actuation by the actuator 50, and is enforced purely by the obstruction entering the space between the concaves and the threshing rotors. FIG. 8 shows the normalized force required to move the roller 45, as a function of the angle between the control plate 35 and the fork 40, as shown in the sequence of drawings 7a to 7f. It is seen that this force drops sharply as a function of the angle. In other words, as soon as the roller 45 begins its rolling motion with respect to the seat portion 47, the required force to move it further drops sharply, resulting in the very fast disengagement of the roller 45 form its seat 47, when an obstruction is encountered that is larger than a given minimum. This fast disengagement is an approximation of the operation of a shear bolt, resulting in a similar safety function, i.e. the concaves drop down before any significant damage is done to the concaves themselves, the threshing rotors or any other working components of the combine.

Figure 9A:
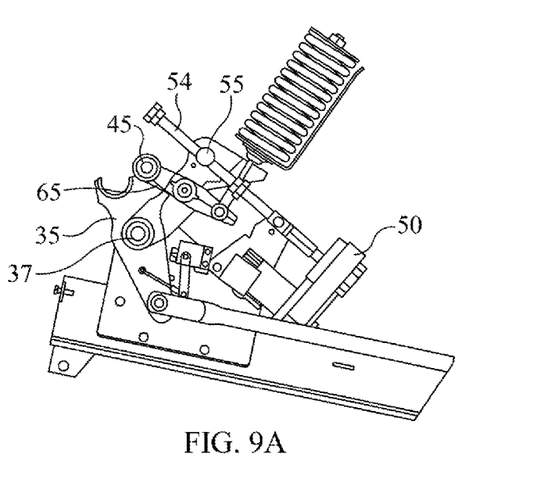
FIGS. 9a to 9f illustrate the manner in which the apparatus is brought back to its initial state after a breakage has occurred.

Advantageously, the apparatus of the invention allows the roller 45 to be brought back to its position lodged in the seat portion 47, by using the actuator 50. This is illustrated in FIGS. 9a to 9f. When the breakage has occurred, the concaves fall down to their lowest position, defined by a stop surface mounted underneath the support plate 16. At this point, the roller has come to a halt on the slanted portion 65 at the top of the control plate 35, as shown in FIG. 9a.

Figure 9B:
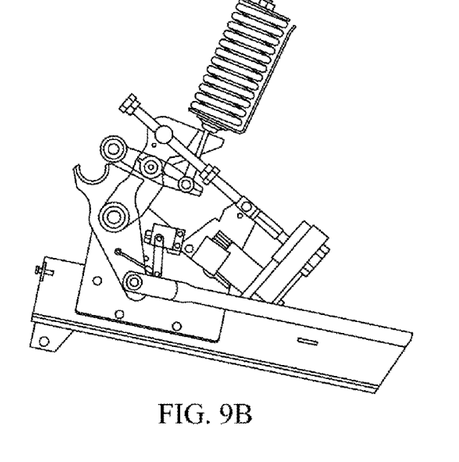
Figure 9C:
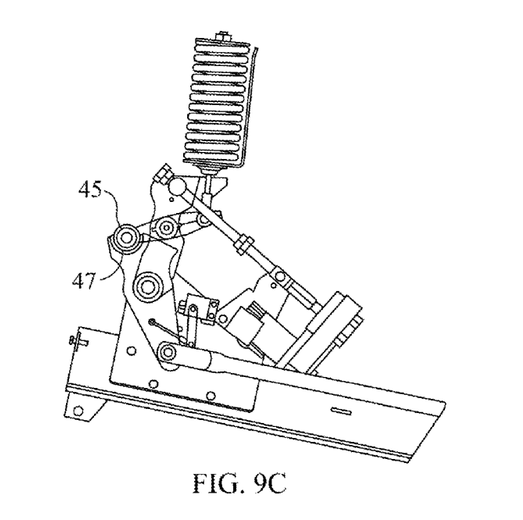
Figure 9D:
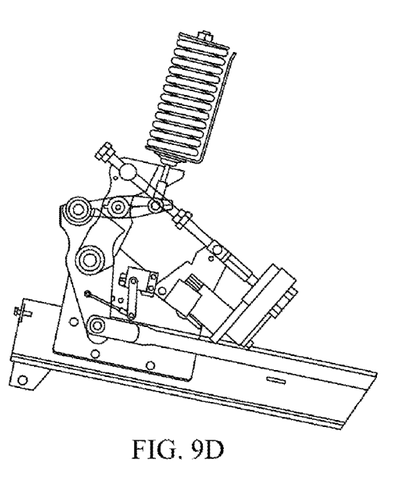
Figure 9E:
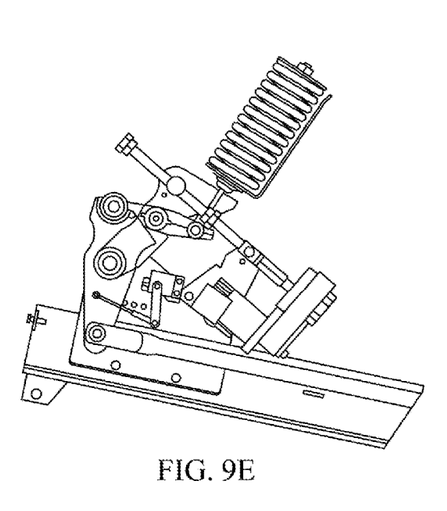
Figure 9F:
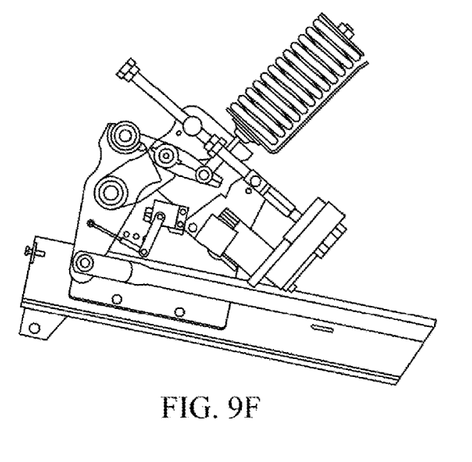

Actuating the actuator 50 now has the following effect: if the threaded rod 54 is rotated so that the cylinder 55 is pushed away from the actuator 50, this will result in the rotation of the fork 40 about its rotation axis 37, and relative to the control plate 35, given that the fork 40 is now no longer tied to the control plate 35. This rotation will gradually push the roller 45 upwards along the slanted portion 65 of the control plate, over the convex portion 60, until the roller snaps back into the seat portion 47 as illustrated in FIGS. 9a to 9c. Then the actuator 50 is operated in the reverse direction, bringing the assembly of the control plate 35 and the fork 40, now again tied together via the spring force, back to its condition before the breakage occurred, as illustrated in FIGS. 9d to 9f. The apparatus of the invention thereby makes it possible to quickly reset the concaves after a breakage, without requiring emptying of the grain tank, and thus allowing to resume operation without excessive downtime.

Figure 10:
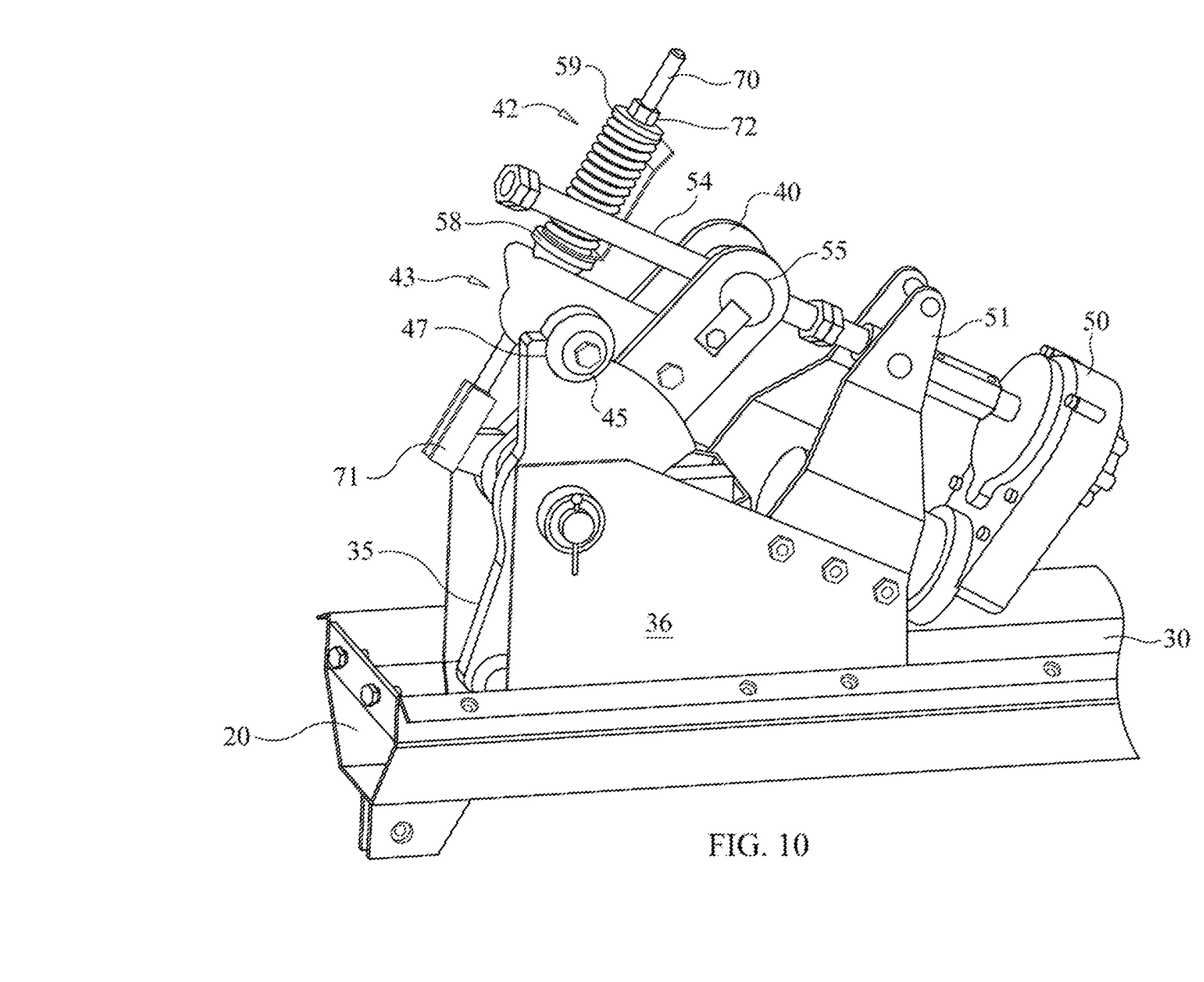
FIG. 10 illustrates an alternative embodiment of an apparatus according to the invention.

Many variations of the apparatus shown in the drawings are possible within the scope of the invention. The mechanical spring 42 may be replaced by a pneumatic or hydraulic spring. The actuator 50 may be any suitable type of actuator capable of controlling the above-described movements. The fork 40 may be replaced by any other suitably shaped part. The spring force may be arranged to act directly on the end of the force transmission part 43 that carries the roller, instead of on the opposite end as is the case in the drawings described so far. This variant is illustrated in FIG. 10. The same numerical references used above are used again in this figure to indicate the same parts or parts having the same function. The fork 40 is now mounted to one side of the control plate 35. A threaded rod 70 is pivotably connected to an extension 71 of the fork. The rod 70 runs through the force transmission part 43 and the lower and upper end plates 58/59 of the mechanical spring 42, with the spring being maintained in a compressed state in the same manner as in the embodiment of FIG. 5, i.e. by a bolt 72 engaging with the threaded end of the rod 70. In this way the rod 70 is pulling one end of the fork (defined by extension 71) towards the force transmission part 43, thereby pushing the roller 45 into the seat portion 47 of the control plate 35. As in the previously described system, the roller 45 can only be released from the seat portion 47 by a force that is capable of counteracting the spring force. After a breakage, the actuator 50 brings the apparatus back to its original state, in the manner described above.

In the apparatus described above and applied for controlling the concaves in a combine harvester, high forces come into play, and the embodiment using a roller 45 as described is the preferred embodiment. The roller 45 and seat portion 47 are preferably produced in hardened material, capable of withstanding the high forces. However in situations where the occurring forces are lower, alternatives can be used. Instead of a roller, any other suitable connection element could be provided, such as an element that glides over the control plate instead of rolling. The force transmission part 43 could be an integral part of the auxiliary part 40, or connected thereto in another way than the way shown in the drawings.

As stated, the apparatus of the invention may be used to control the position and provide a safety release function for other components besides the concaves in a combine harvester. The apparatus could, e.g., be used with the counter knives assembly in a chopper arrangement. In some applications, the safety function needs to allow breakage in two opposite directions. In that case, the control plate 35 may be designed symmetrically with respect to the seat portion 47, i.e. comprising a convex portion 60 and slanted portion 65 on both sides of the seat portion 47.

The invention claimed is:

1. A positioning and safety apparatus for controlling the position of a movable component of a mechanical system, the movable component being movable with respect to a fixed structure, and for exhibiting a safety function when the movable component is subjected to a force that exceeds a pre-defined limit, the positioning and safety apparatus comprising:

a control part for being mounted on the fixed structure and for being pivotable with respect to the fixed structure about a pivot axis, the control part having a first end and a second end opposite to the first end with respect to the pivot axis, the first end of the control part configured for being connected to the movable component so that a rotation of the control part about the pivot axis actuates a movement of the movable component;

an auxiliary part that is pivotable with respect to the fixed structure about the same pivot axis as the control part; and an actuator configured to actuate the rotation of the control part about the pivot axis so as to thereby actuate the movement of the movable component in order to control its position, and further configured to act upon the auxiliary part, wherein the auxiliary part is:

tied to the second end of the control part by a spring force, and remains so when the movable component is subjected to a force lower than the pre-defined limit; and configured to become untied from the control part, when the movable component is subjected to a force higher than the pre-defined limit, thereby allowing the movable component to move freely towards a stop position, and wherein the actuator is configured to be able to return the auxiliary part to the position wherein it is tied to the control part, thereby resuming control of the position of the movable component.

2. The apparatus according to claim 1, wherein the actuator is pivotable with respect to the fixed structure.

3. The apparatus according to claim 1, wherein:

the auxiliary part is tied to the second end of the control part through a force transmission part that is pivotable about a pivot axis with respect to the auxiliary part, and which carries at one end a roller, rotatable with respect to the force transmission part, the control part is provided at its second end with a seat portion configured to receive the roller, the spring force is generated by a spring configured to exert the spring force between the auxiliary part and the force transmission part, the force transmission part is subjected to the spring force in such a manner that the roller is pushed into the seat portion, and maintained therein when the movable component is subjected to forces lower than the pre-defined limit, the roller is configured to be able to roll out of the seat portion when the movable component is subjected to forces higher than the pre-defined limit, and the actuator is configured to be able to return the auxiliary part to the position wherein it is tied to the control part, thereby rolling the roller back into the seat portion.

4. The apparatus according to claim 3, wherein the force transmission part has a first end and a second end opposite the first end with respect to the pivot axis of the force transmission part, and wherein the roller is mounted at the first end of the force transmission part and the spring force acts on the second end of the force transmission part.

5. The apparatus according to claim 4, wherein the spring is a linear spring mounted between a lower end plate and an upper end plate, the lower end plate being supported by the auxiliary part, and wherein the spring is configured to pull the second end of the force transmission part towards the auxiliary part.

6. The apparatus according to claim 5, wherein the spring is provided with a rod running through the spring, through the lower end plate, and through the auxiliary part, the rod being pivotably connected at one end of the rod to the force transmission part and connectable at the other end of the rod to the upper end plate, so that when the spring is compressed, the rod pulls the second end of the force transmission part towards the auxiliary part.

7. The apparatus according to claim 6, wherein:

the control part is a control plate, the auxiliary part is a fork having a platform portion and two legs extending downward from the platform portion, the legs extending on either side of the control plate, the force transmission part is mounted between the legs of the fork, and the spring is mounted on top of the platform portion.

8. The apparatus according to claim 3, wherein the force transmission part has a first end and wherein the roller is mounted at the first end of the force transmission part and the spring force acts on the first end of the force transmission part.

9. The apparatus according to claim 8, wherein the spring is a linear spring mounted between a lower end plate and an upper end plate, the lower end plate being supported by the force transmission part, and wherein the spring is configured to pull one end of the auxiliary part towards the force transmission part.

10. The apparatus according to claim 9, wherein the spring is provided with a rod running through the spring, through the lower end plate and through the force transmission part, the rod being pivotably connected at one end of the rod to the auxiliary part and connectable at the other end of the rod to the upper end plate, so that when the spring is compressed, the rod pulls the one end of the auxiliary part towards the force transmission part.

11. The apparatus according to claim 3, wherein the seat portion and the roller are configured so that the separation of the auxiliary part from the control part resembles the operation of a shear bolt.

12. A combine harvester, comprising:

a fixed structure;

a component movable with respect to the fixed structure; and at least one positioning and safety apparatus for controlling the position of the movable component, and for exhibiting a safety function when the movable component is subjected to a force that exceeds a pre-defined limit, the at least one positioning and safety apparatus comprising:

a control part mounted on the fixed structure and for being pivotable with respect to the fixed structure about a pivot axis, the control part having a first end and a second end opposite to the first end with respect to the pivot axis, the first end of the control part connected to the movable component so that a rotation of the control part about the pivot axis actuates a movement of the movable component;

an auxiliary part that is pivotable with respect to the fixed structure about the same pivot axis as the control part; and an actuator configured to actuate the rotation of the control part about the pivot axis so as to thereby actuate the movement of the movable component in order to control its position and further configured to act upon the auxiliary part, wherein the auxiliary part is:
- tied to the second end of the control part by a spring force, and remain so when the movable component is subjected to a force lower than the pre-defined limit, and
- configured to become untied from the control part, when the movable component is subjected to a force higher than the pre-defined limit, thereby allowing the movable component to move freely towards a stop position, and wherein the actuator is configured to be able to return the auxiliary part to the position wherein it is tied to the control part, thereby resuming control of the position of the movable component.

13. The combine harvester according to claim 12, further comprising at least one threshing rotor comprising one or more movable concaves mounted underneath at least a portion of the at least one threshing rotor, wherein the one or more movable concaves are the movable part, wherein the at least one positioning and safety apparatus is configured to control a position of the one or more movable concaves with respect to the fixed structure, and to provide a safety function when the one or more concaves are subjected to downward forces above a predefined limit.

14. The combine harvester according to claim 12, wherein at least one of the one or more movable concaves comprises two longitudinal edges and is movable by being pivotable about one longitudinal edge, the other edge being suspended from a movable support plate, the movable support plate being movable with respect to the fixed structure, and wherein the movement of the movable support plate is controllable by the at least one positioning and safety apparatus.

* * * * *